United States Patent
Ioannou et al.

(10) Patent No.: US 9,892,128 B2
(45) Date of Patent: *Feb. 13, 2018

(54) TECHNIQUES FOR IMPROVING DEDUPLICATION EFFICIENCY IN A STORAGE SYSTEM WITH MULTIPLE STORAGE NODES

(71) Applicant: INTERNATIONAL BUSINESS MACHINES CORPORATION, Armonk, NY (US)

(72) Inventors: Nikolas Ioannou, Zurich (CH); Ioannis Koltsidas, Zurich (CH); Roman A. Pletka, Zurich (CH); Cheng-Chung Song, Tucson, AZ (US); Radu Stoica, Zurich (CH); Sasa Tomic, Kilchberg (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,001

(22) Filed: Jun. 16, 2017

(65) Prior Publication Data
US 2017/0351698 A1    Dec. 7, 2017

Related U.S. Application Data

(63) Continuation of application No. 15/171,747, filed on Jun. 2, 2016, now Pat. No. 9,690,801.

(51) Int. Cl.
G06F 17/30    (2006.01)

(52) U.S. Cl.
CPC .... G06F 17/30159 (2013.01); G06F 17/3033 (2013.01)

(58) Field of Classification Search
CPC ...................... G06F 17/30159; G06F 17/3033
See application file for complete search history.

(56) References Cited

U.S. PATENT DOCUMENTS

| | | | |
|---|---|---|---|
| 8,898,120 B1 | 11/2014 | Efstathopoulos |
| 8,930,648 B1 | 1/2015 | Storer et al. |
| 8,996,468 B1 | 3/2015 | Mattox |
| 9,021,296 B1 | 4/2015 | Kiselev et al. |

(Continued)

FOREIGN PATENT DOCUMENTS

| | | |
|---|---|---|
| EP | 002810171 A1 | 11/2014 |
| WO | 2015007594 | 1/2015 |
| WO | 2014164016 A3 | 2/2015 |

OTHER PUBLICATIONS

Sengar, Seetendra Singh, et al.,"E-DAID: An Efficient Distributed Architecture for In-Line Data De-duplication", In Communication Systems and Network Technologies (CSNT), 2012 International Conference on, pp. 438-442. IEEE, 2012.

(Continued)

*Primary Examiner* — Richard Bowen
(74) *Attorney, Agent, or Firm* — Michael R. Long; Randall J. Bluestone

(57) ABSTRACT

Techniques for selecting a storage node of a storage system to store data include applying a first function to at least some data chunks of an extent to provide respective first values for each of the at least some data chunks. A storage node, included within multiple storage nodes of a storage system, is selected to store the extent based on a majority vote derived from the respective first values.

14 Claims, 17 Drawing Sheets

(56) References Cited

U.S. PATENT DOCUMENTS

| | | | |
|---|---|---|---|
| 9,690,801 B1 | 6/2017 | Ioannou et al. | |
| 2011/0099351 A1 | 4/2011 | Condict et al. | |
| 2012/0117028 A1 | 5/2012 | Gold et al. | |
| 2012/0150826 A1 | 6/2012 | Vijayan Retnamma et al. | |
| 2013/0018854 A1 | 1/2013 | Condict | |
| 2014/0358871 A1 | 12/2014 | Cideciyan et al. | |
| 2015/0006846 A1 | 1/2015 | Youngworth | |
| 2015/0032978 A1 | 1/2015 | Bashyam et al. | |
| 2015/0095346 A1 | 4/2015 | Kimmel et al. | |
| 2015/0106345 A1 | 4/2015 | Trimble et al. | |
| 2015/0261466 A1 | 9/2015 | Gu et al. | |

OTHER PUBLICATIONS

Ioannou et al., U.S. Appl. No. 15/171,747, filed Jun. 2, 2016 Non-Final Office Action dated Oct. 3, 2016.

Ioannou et al., U.S. Appl. No. 15/171,747, filed Jun. 2, 2016 Notice of Allowance dated Feb. 21, 2017.

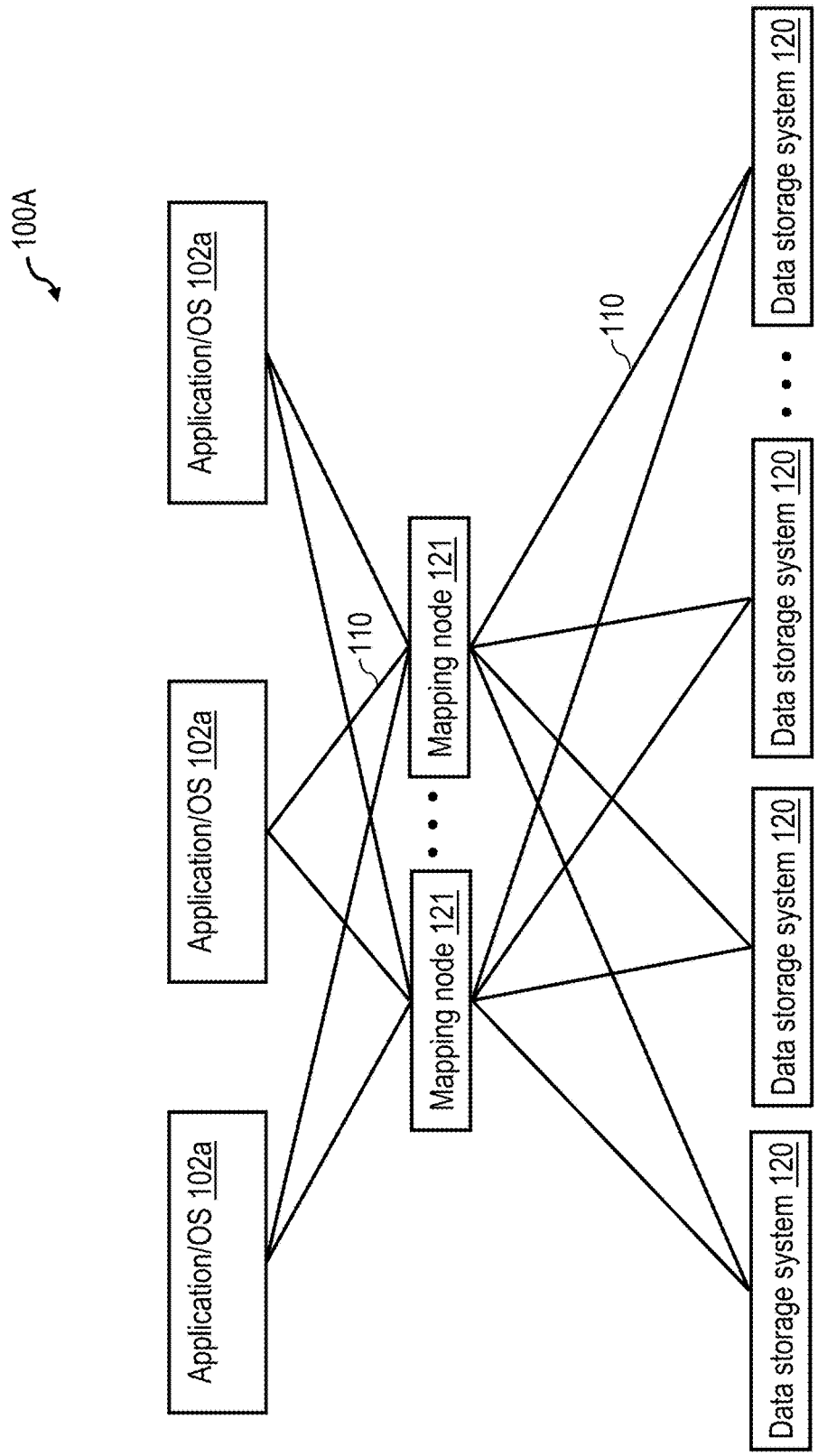

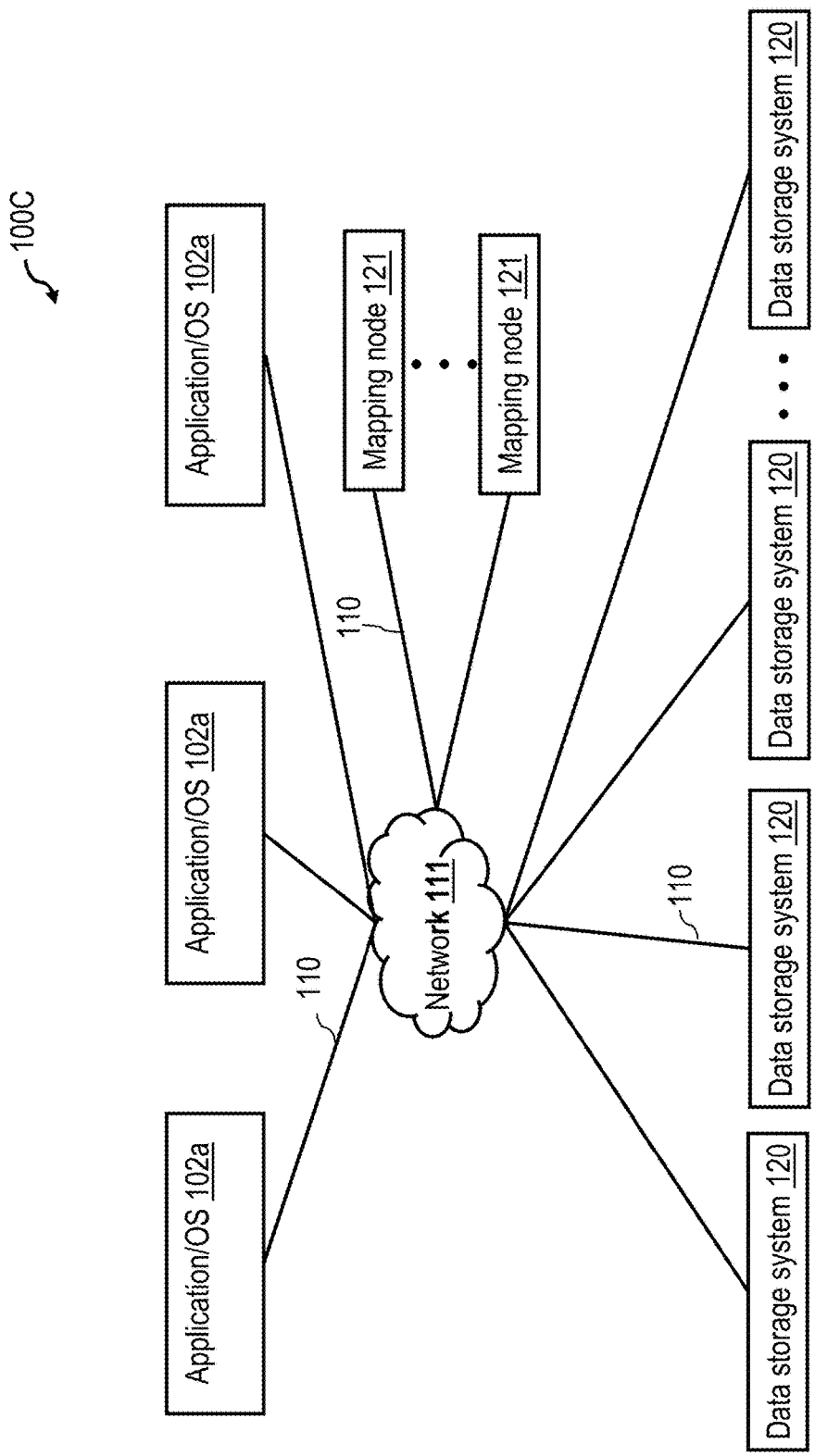

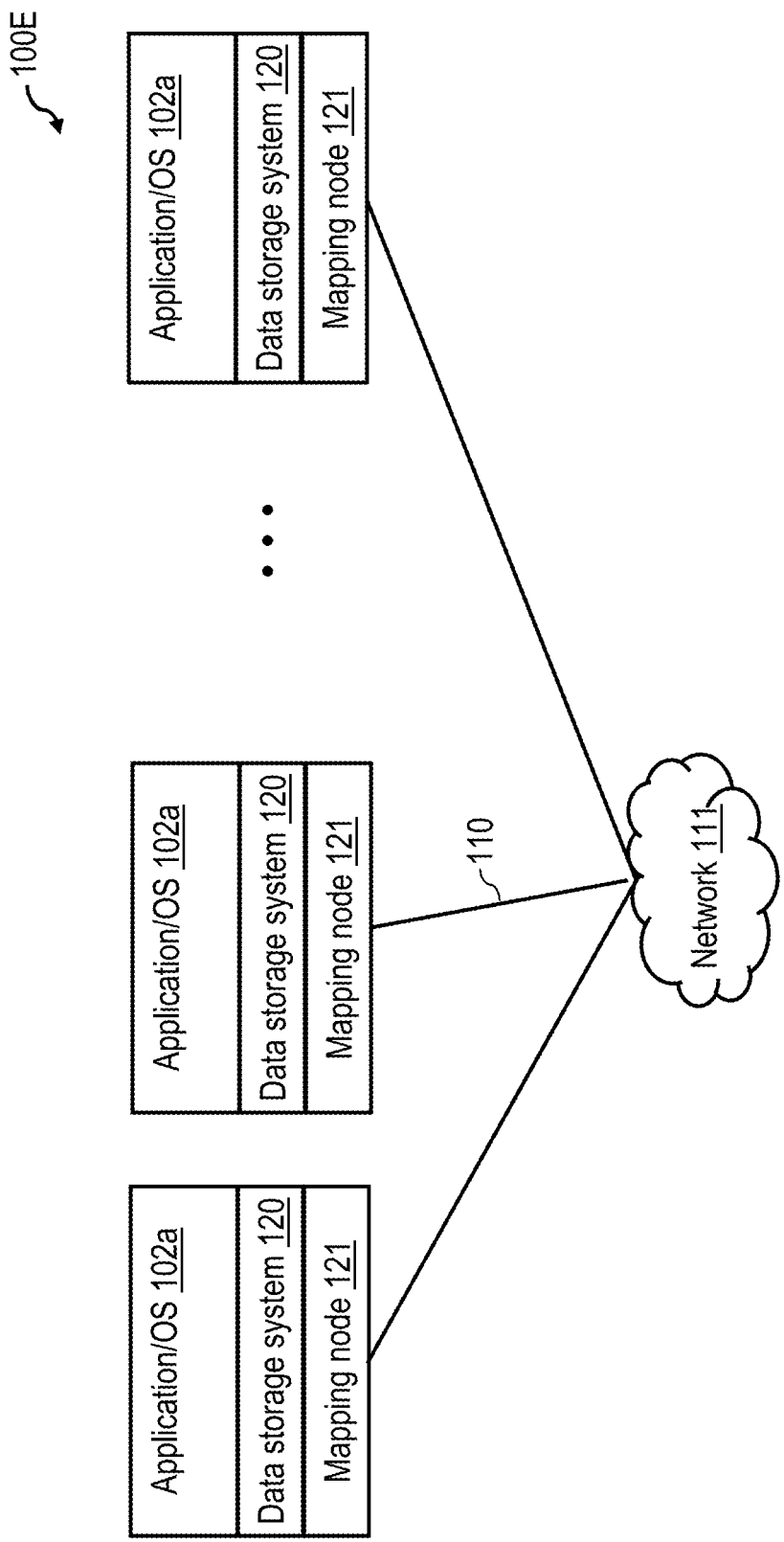

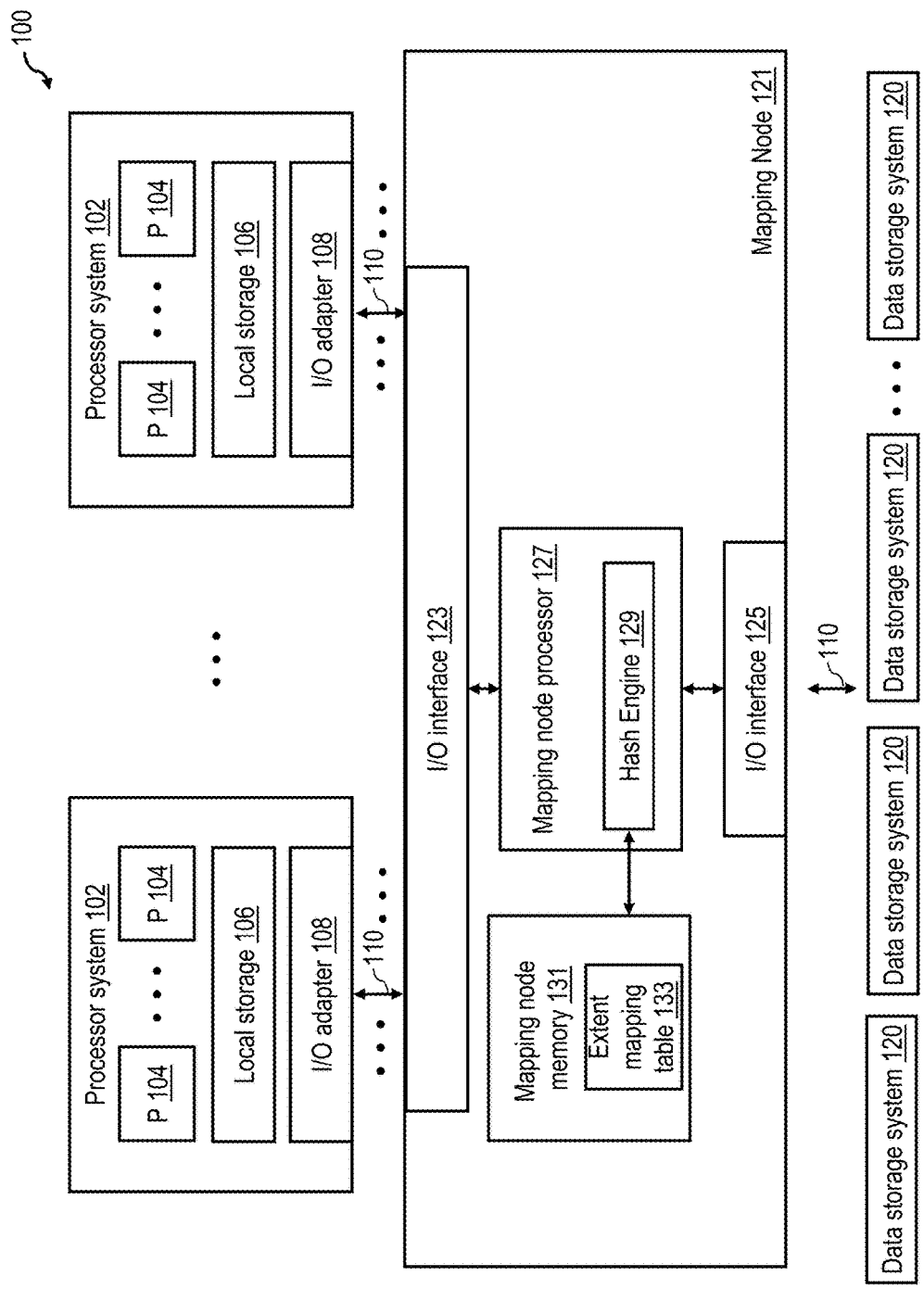

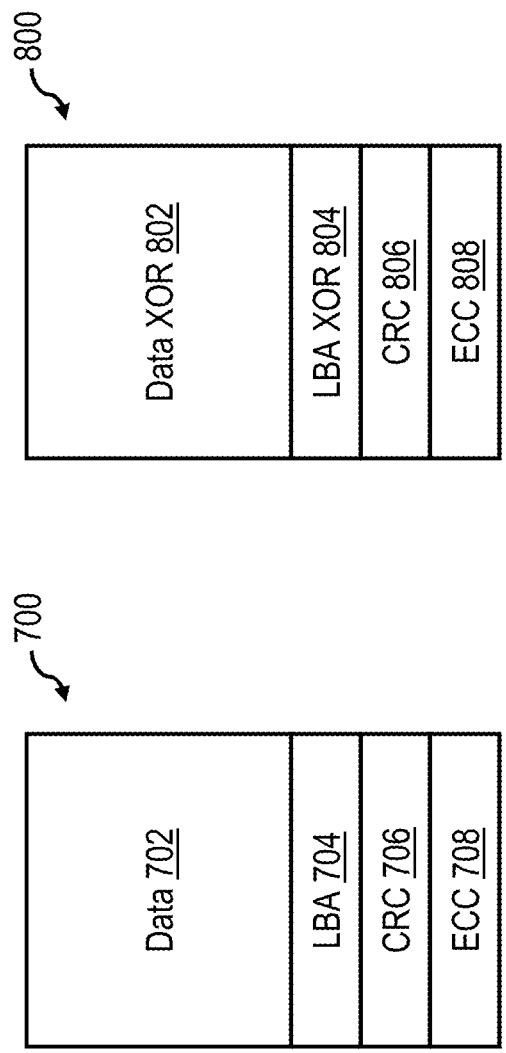

TECHNIQUES FOR IMPROVING DEDUPLICATION EFFICIENCY IN A STORAGE SYSTEM WITH MULTIPLE STORAGE NODES

PRIORITY CLAIM

This application is a continuation of and claims priority to U.S. application Ser. No. 15/171,747, which is incorporated herein by reference in its entirety.

BACKGROUND OF THE INVENTION

This disclosure relates to selecting a storage node in a storage system to store data and, more specifically, to techniques for improving deduplication efficiency in a storage system with multiple storage nodes.

In computing, data deduplication is a technique for eliminating duplicate copies of data. Data deduplication is used to reduce storage utilization and can also be applied to network data transfers to reduce a number of bytes transmitted. In the deduplication process, unique blocks of data (i.e., data chunks) are identified and a hash of their content is stored during a process of analysis. As the analysis continues, hashes of other chunks of data are compared to the stored hashes and when a match occurs the redundant chunk of data is replaced with a reference that points to the stored chunk of data. The content of the two chunks of data may also be compared to guarantee that the hash comparison did not produce a false positive. Given that the same byte pattern may occur dozens, hundreds, or even thousands of times (e.g., a match frequency may be dependent on a chunk size), the amount of data that must be stored or transferred can be greatly reduced. For example a typical email system may contain one-hundred (100) instances of the same one (1) megabyte (MB) file attachment. Each time the email system is backed up, all one-hundred (100) instances of the attachment may be stored, requiring one-hundred (100) MB of storage space. When data deduplication is implemented, only one instance of the attachment is actually stored and subsequent instances are referenced to the stored instance. In general, storage-based data deduplication reduces the amount of storage needed for a given data set.

In-line data deduplication storage systems conventionally perform deduplication in real-time by eliminating duplicate data copies as the data enters a storage system and before it is written to a storage medium. When a storage system receives new data, the storage system determines if the new data corresponds to existing data that is already stored and, if so, the storage system references the existing data and does not store the new data. With background data deduplication, new data is first stored on the storage system and then a background process is initiated at a later point-in-time to search for duplicate data. A benefit of background data deduplication is that there is no need to wait for hash computation and lookup to be completed before storing incoming data, thereby ensuring that storage system performance is not degraded. A drawback of background data deduplication is that duplicate data is stored, which may be an issue if a storage system is near full capacity. A benefit of in-line data deduplication over background data deduplication is that in-line data deduplication requires less storage, as data is not duplicated in the storage system. However, given that hash computations and lookups may take a relatively long time period to perform, data ingestion for in-line data deduplication can be slower than background data deduplication, thereby reducing write throughput of a storage system. Storage systems supporting deduplication typically implement one of these two techniques or a combination thereof and may perform data deduplication at a global level or at a storage node level.

Storage systems are sometimes composed of several storage nodes in order to scale performance and storage capacity to match the requirements of many application classes. Multi-node storage systems facilitate incrementally adding storage nodes to ensure that the cost of a storage system is proportional to the needs of a user. In general, distributed storage systems offer much higher throughput as they aggregate the performance of many storage nodes. Moreover, multi-node storage systems can accommodate more classes of applications with different performance requirements.

In a storage system with several storage nodes, deduplication can either be performed globally (all copies of a chunk are eliminated) or locally (only the copies of a block local to a storage node are eliminated). Global deduplication, although resulting in a higher data reduction than local deduplication, is more difficult to implement as the storage system has to manage a very large amount of globally distributed metadata. Storage systems that perform data deduplication at a storage node level usually experience lower deduplication efficiency than storage systems that have performed data deduplication at a global level. However, local deduplication has a simpler and more efficient design, as much less metadata has to be maintained.

BRIEF SUMMARY

A technique for selecting a storage node of a storage system to store data includes applying a first function to content in at least some data chunks of an extent to provide respective first values for each of the data chunks. A storage node, included within multiple storage nodes of the storage system, is selected to store the extent based on a majority vote derived from the respective first values.

The disclosed techniques may be implemented as a method, a storage system, and/or a program product (including program code stored in a storage device).

BRIEF DESCRIPTION OF THE SEVERAL VIEWS OF THE DRAWINGS

FIG. 1A is a high level block diagram of a data processing environment in accordance with one embodiment;

FIG. 1C is a high level block diagram of a data processing environment in accordance with yet another embodiment;

FIG. 1E is a high level block diagram of a data processing environment in accordance with an embodiment;

FIG. 1F is a high level block diagram of a data processing environment in accordance with another embodiment further illustrating a mapping node;

FIG. 7 illustrates an exemplary codeword stored in each data page in accordance with the present disclosure;

FIG. 8 depicts an exemplary codeword stored in each data protection page in accordance with the present disclosure;

DETAILED DESCRIPTION

Figure 1B:
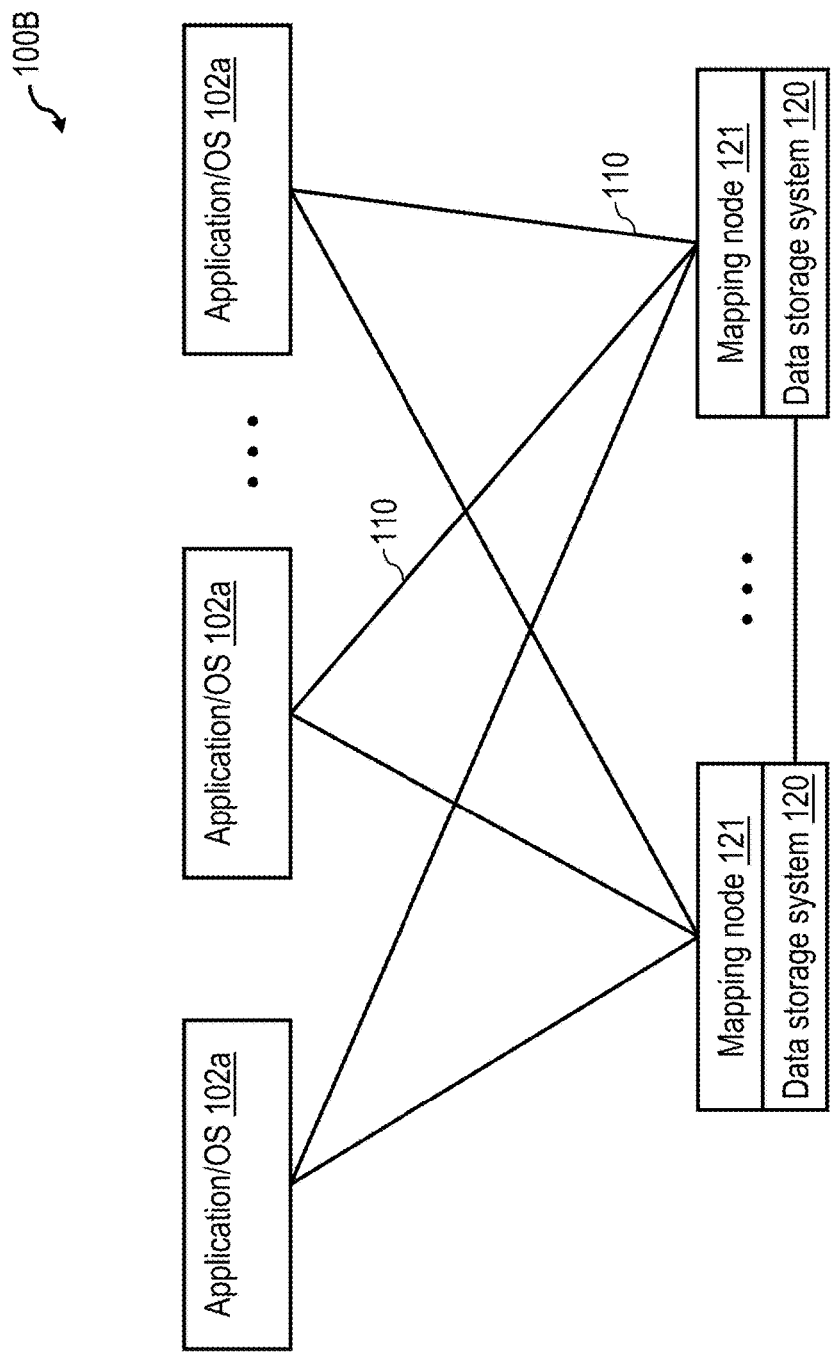
FIG. 1B is a high level block diagram of a data processing environment in accordance with another embodiment.

As mentioned above, data deduplication may be implemented in-line and/or as a background functionality that searches for duplicate data in an existing data set stored in a storage system. Conventionally, in order to detect a duplicate data chunk, respective fingerprints of data chunks have been computed and then compared. Typically, an index data structure of fingerprints for stored data chunks has been maintained to facilitate detection of duplicate data chunks prior to a write operation. Due to computational overhead and memory constraints, data deduplication may be performed in a best-effort way, which may result in not all data being deduplicated in-line. In this case, a search for duplicate data chunks has conventionally been initiated in the background when a load on a storage system is relatively low.

In a storage system that includes multiple storage nodes, data deduplication may be implemented above a storage node level (i.e., eliminate duplicates globally across multiple storage systems) or at the storage node level (i.e., eliminate duplicates only inside one storage node). Implementing data deduplication above a storage node level usually increases data deduplication efficiency, as only a single copy (not taking into account any redundant copies or parity) of each unique data chunk is typically stored. In data storage systems in which deduplication is performed independently inside each storage node, the same unique data chunk may be stored on all storage nodes. For example, in the worst case for a storage system with 'N' storage nodes that implements deduplication only at a storage node level, consumed storage space may be 'N' times that of a storage system that implements deduplication at a global level. However, performing deduplication at a global level (i.e., above a storage node level) has several issues. For example, in global level deduplication scalability is limited as the computation of hashes, metadata management operations, and memory requirements for caching metadata cannot easily be distributed and synchronized. Moreover, it may be difficult to add hardware support for deduplication at a global level in a storage system given time constraints for processing data in-line. For example, the hash functions used for performing deduplication can be computationally intensive and require specialized hardware to ensure high performance.

According to one or more disclosed embodiments, data is routed in a storage system with multiple storage nodes in a way that combines the higher data reduction benefit of global deduplication with the simplicity and performance of local deduplication. According to one or more embodiments of the present disclosure, data deduplication efficiency in a storage system with multiple storage nodes may be improved by implementing majority voting techniques that increase the probability that duplicate chunks are designated to be stored on the same storage node. In general, the disclosed majority voting techniques significantly reduce the number of copies of the same data chunk on different storage nodes at the same time.

According to various aspects of the present disclosure, a first function (e.g., a hash function) is applied to each data chunk in an extent to provide a first function value (e.g., hash value) for each data chunk. As used herein, the term 'extent' refers to a contiguous aligned data chunk with a fixed size (e.g., 1 MB, 16 MB, etc.) for a storage system. Each hash value is then mapped to a storage node in the data storage system by a second function. As one example, the second function may provide a modulo 'N' of a hash value (e.g., hash_value modulo number_storage_nodes), where 'N' corresponds to the number of storage nodes in the storage system. In one or more embodiments, data chunks in an extent are then destaged to the storage node that has the highest number of votes (i.e., the storage node with the majority vote). It should be appreciated that when two or more storage nodes have an equal number of votes that another technique may be employed to determine to which storage node an extent should be mapped. Such techniques can utilize knowledge of the load distribution in the storage system (i.e., the amount of logical and physical data stored by each storage node).

According to one or more embodiments of the present disclosure, a relatively inexpensive hash function may be utilized on each data chunk (i.e., deduplication chunk) in an extent (storage system partition) at a mapping node level (or before the data reaches the storage node level) to generate a hash value. It should be noted that this hash value is not needed for the purpose of performing deduplication and is not usually needed for storing data on the storage nodes. There is also no need to store this hash value, however, it may be beneficial to cache these values. The hash value that is mapped to one storage node is referred to as a 'vote' for that storage node. In this manner, for each deduplication chunk in the extent a storage node for storing data of the deduplication chunk is determined. According to one or more embodiments, frequent data chunks may bias a voting decision and therefore may be omitted. Each extent is then mapped to a storage node based on a majority vote. When an extent is ready to be destaged, the extent may be mapped to the storage node with the most votes.

It should be appreciated that majority voting facilitates performing deduplication at a storage node level while significantly reducing the number of copies of a same data chunk that exist on different storage nodes in a storage system at the same time. One difference between majority voting and other data mapping/routing approaches is that majority voting also facilitates achieving data balancing. Majority voting routes probabilistically a similar amount of user data (logical data before deduplication is performed) to each storage node and ensures that a similar amount of physical data (physical data after deduplication is performed) is stored on each storage node. In other data mapping/routing schemes large load imbalances are possible, as storage nodes with duplicate data attract newly written data resulting in either imbalances of space utilization in the storage nodes or uneven amounts of logical data stored on each storage node.

In various embodiments, deduplication is performed on data chunks inside extents. Data chunks are typically significantly smaller (e.g., 4 kB, 8 kB, etc.) than an extent and may be of variable size. According to one or more embodiments, sequentially written data may be transferred (destaged) from a mapping node in extent sizes or in smaller units for small random updates. In one or more embodiments, a mapping node loads an entire extent into an associated cache in background in response to a small random write for the extent.

Assuming an entire extent was written and is going to be destaged to a storage node (it should be noted that replication, etc. may actually result in writes to more than one storage node, but the techniques can be readily extended to other cases), a mapping node generates hash values for each data chunk in the extent. In various embodiments, the hash function is a computationally inexpensive hash function (as there is no need to utilize a cryptographic hash function such as SHA-1, which may be used internally by a storage node deduplication process to identify equal content without need to compare data). Any general hash function that maps data of an arbitrary size to data of a fixed size can be used. Cryptographically secure hash functions have the properties of being very difficult to invert and have a negligible collision probability. Neither of these properties are required by the hash function used. However, a cryptographic hash function or a fingerprint engine may theoretically be used as well.

In the event that an existing extent is partially updated (e.g., due to a random write workload), majority voting may be implemented in a number of manners. For example, a mapping node may load missing data chunks in an extent from storage devices of the storage system into an associated cache. In this case, when data is destaged, majority voting can be performed in the manner described above. In one or more embodiments, a required majority vote is set at a threshold level to prevent swapping an extent (back and forth) between storage nodes. When a mapping node does not load data that is missing in an extent, a majority vote may still be employed if there are enough updates in the extent to justify a new majority vote. In one or more embodiments, a required majority vote is also required to be greater than a threshold value (e.g., higher than 'X' votes). In case there are not enough votes or the votes are below an implemented threshold, data may be written to a previous location, if any, when destaged.

In one or more embodiments, a background deduplication task that periodically processes stored data to determine a best storage node for the data is implemented. As one example, a background deduplication task may take into account additional information, e.g., whether global deduplication efficiency is increased by remapping an extent. Implementing a background deduplication task is also desirable in the event that storage nodes are added to a data storage system in order to re-balance stored data over all nodes. A background relocation process may take into account the amount of logical data, the amount of physical data stored, or the I/O traffic experienced by each storage node and relocate extents in such a way that evens out the different metrics. Implementing data deduplication as a background process facilitates re-evaluating the placement of extents. Implementing data deduplication as a background process may be particularly advantageous when multiple updates to an extent are below a relocation threshold level. Moreover, implementing data deduplication as a background process allows for postponing relocation overhead in case of load spikes and may be used to improve load balancing. Load balancing goals for routing data in a distributed storage system include: even distribution of logical data, i.e., the same amount of logical (user) data should be stored on each storage node; even distribution of physical data, i.e., the same amount of physical data (after deduplication) should be stored on all storage nodes; and the same amount of frequently accessed data should be stored on all the storage nodes.

With reference to the figures and with particular reference to FIG. 1A, there is illustrated a high level block diagram of an exemplary data processing environment 100A, which includes multiple data storage systems (storage nodes) 120 that are configured to perform data deduplication according to the present disclosure. Data processing environment 100A includes one or more hosts, (e.g., processor systems 102 of FIG. 1F) that execute an application/operating system (OS) 102a that is in communication with mapping nodes 121. While only two mapping nodes 121 are specifically illustrated in FIG. 1A it should be appreciated that a data processing environment configured according to the present disclosure may have more or less than two mapping nodes. As is illustrated, each mapping node 121 is coupled to all storage nodes 120 in data processing environment 100A to facilitate destaging an extent to any storage node 120 within data processing environment 100A. While only four storage nodes 120 are specifically illustrated in FIG. 1A it should be appreciated that a data processing environment configured according to the present disclosure may have more or less than four storage nodes.

In FIG. 1A each application/OS 102a executes on a stand-alone machine and communicates with storage nodes 120 via mapping nodes 121, which function as gateways. It should be appreciated that application/OS 102a, mapping node 121, and storage node 120 may interact, communicate, and share hardware in various manners in a data processing environment. Mapping node 121 may be configured to only receive votes instead of actual data. That is, the calculation of votes can be performed elsewhere (for example, vote calculation can be performed by application servers or data storage systems) and data does not have to necessarily flow through mapping nodes 121. The voting outcome for an extent can be cached or summarized in mapping nodes 121. Such additional metadata allows the write process in case of partial extent updates or the background relocation process to more accurately detect when extent relocations are beneficial without reloading the data.

With reference to FIG. 1B, a data processing environment 100B is illustrated that is similar to data processing environment 100A, with the exception that mapping nodes 121 are co-located with storage nodes 120. In this case, mapping node 121 functionality is implemented by each storage node 120, which obviates the need for an additional server to implement each mapping node 121.

With reference to FIG. 1C, a data processing environment 100C is illustrated that implements a shared network implementation. In data processing environment 100C, network 111 is utilized to communicate between all components and data can flow directly between application servers (executing application/OS 102a) and storage nodes 120. In this case, voting can be performed at the application servers and mapping nodes 121 may be limited to only maintaining metadata.

Figure 1D:
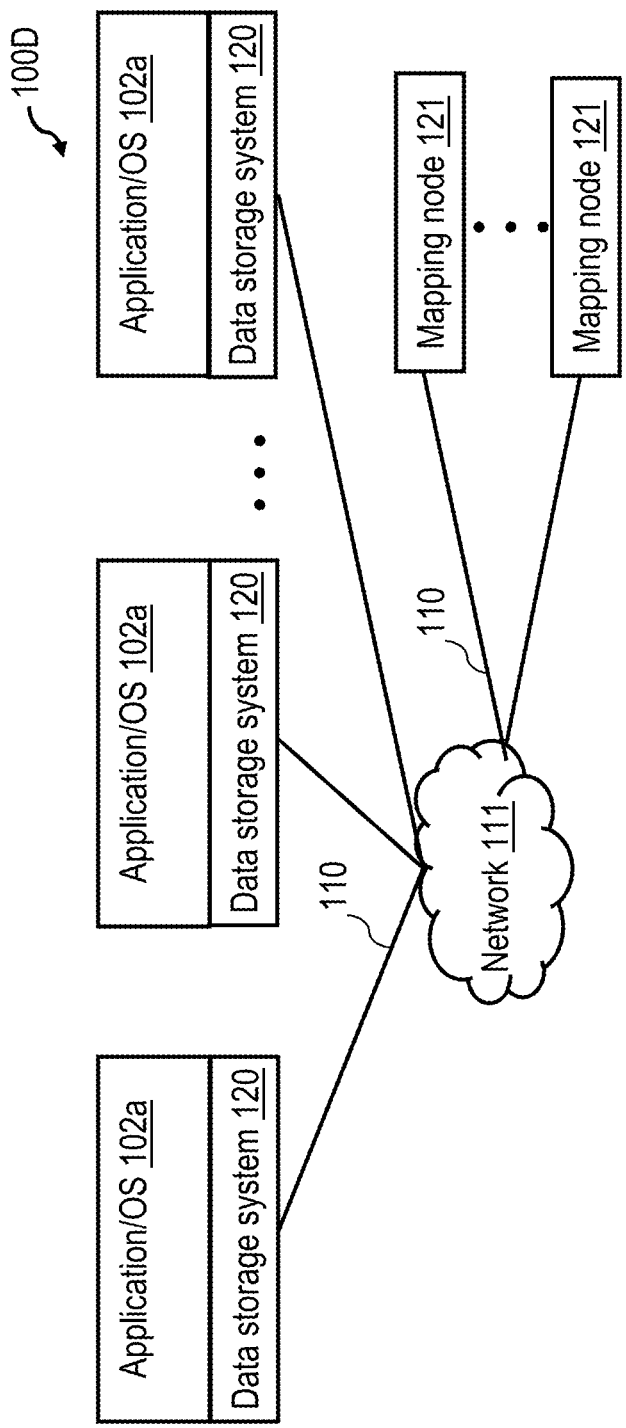
FIG. 1D is a high level block diagram of a data processing environment in accordance with still another embodiment.

With reference to FIG. 1D, a data processing environment 100D is illustrated that implements a configuration where application nodes and storage nodes are collocated on the same physical servers and share the same network. In data processing environment 100D, network 111 is utilized to communicate between all components and the servers execute application/OS 102a and implement storage nodes 120. With reference to FIG. 1E, a data processing environment 100E is illustrated that implements a configuration where the application node, storage nodes, and the mapping nodes all share the same physical servers. Network 111 is utilized to communicate between servers, which each execute application/OS 102a and implement mapping node 121 and storage node 120.

With reference to FIG. 1F there is illustrated a high level block diagram of an exemplary data processing environment 100 (similar to data processing environment 100A) including a data storage system 120 that is configured to perform data deduplication according to the present disclosure and having a non-volatile memory array as described further herein. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a mapping node 121 via an I/O channel 110, which is coupled to data storage system 120 via another I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

As previously mentioned, mapping node 121 can be implemented in a stand-alone server, or integrated in either processor system 102 or data storage system 120, where it may be located in, for example, interface node 122. In case mapping node 121 is integrated into another component, information stored in mapping node memory 131 may be stored in a distributed fashion among all the nodes (processor systems 102 or storage systems 120). In addition, an integrated approach does not require transfer of actual data to mapping node 121. For example, only computed hash values of an extent may be sent to mapping node 121, which in turn returns corresponding mapping information. As is illustrated, mapping node 121 includes an I/O interface 123 that facilitates communication with processor systems 102 and an I/O interface 125 that facilitates communication with storage nodes 120. Mapping node 121 also includes a mapping node processor 127 that implements a hash engine 129 and which is coupled between I/O interfaces 123 and 125. Mapping node processor 127 is coupled to mapping node memory 131, which stores an extent mapping table 133 that indicates which data storage system 120 stores each extent.

Figure 1G:
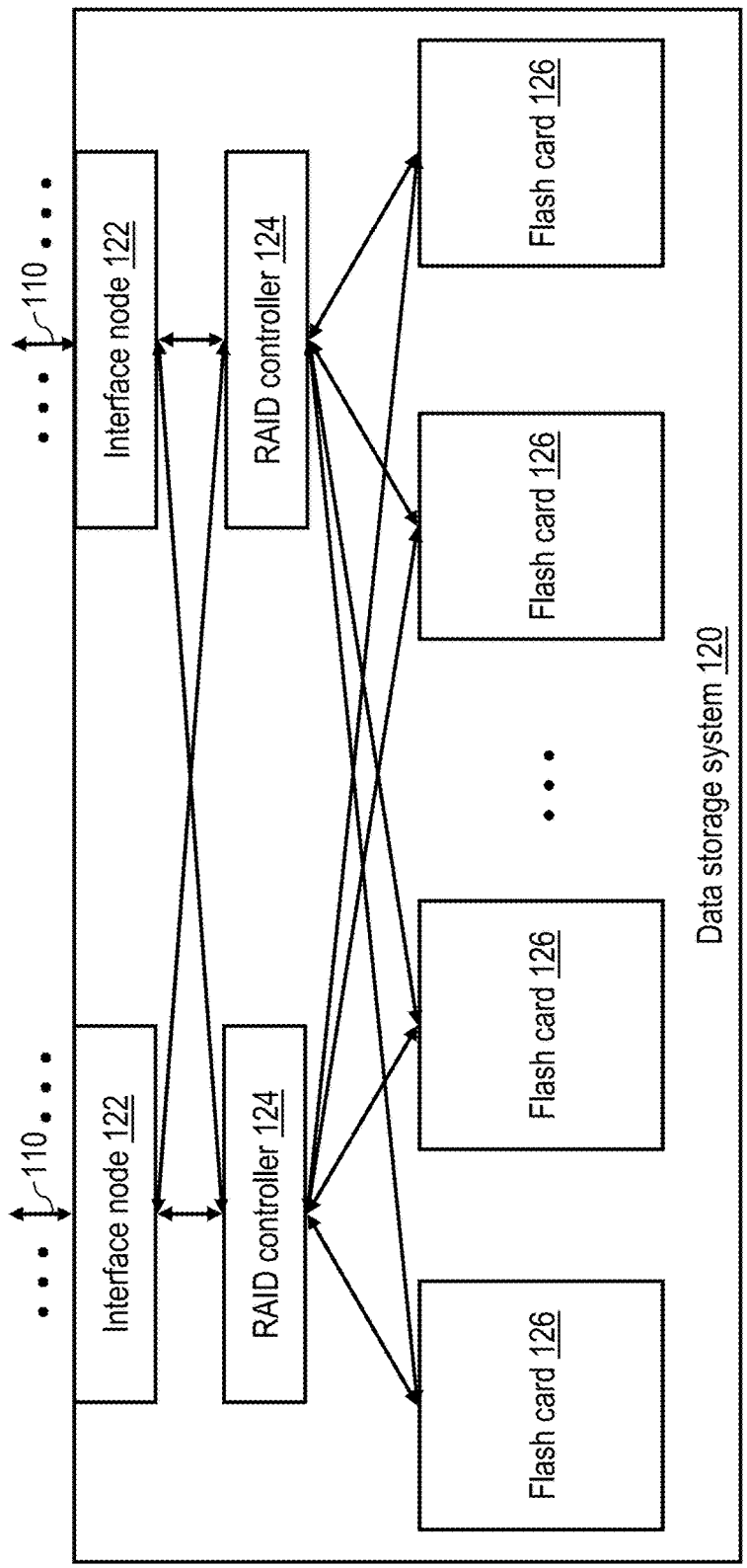
FIG. 1G is a more detailed block diagram of an exemplary data storage system (storage node) of FIG. 1F.

Referring to FIG. 1G, data storage system 120 includes multiple interface nodes 122 through which data storage system 120 receives and responds to IOPs via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1H:
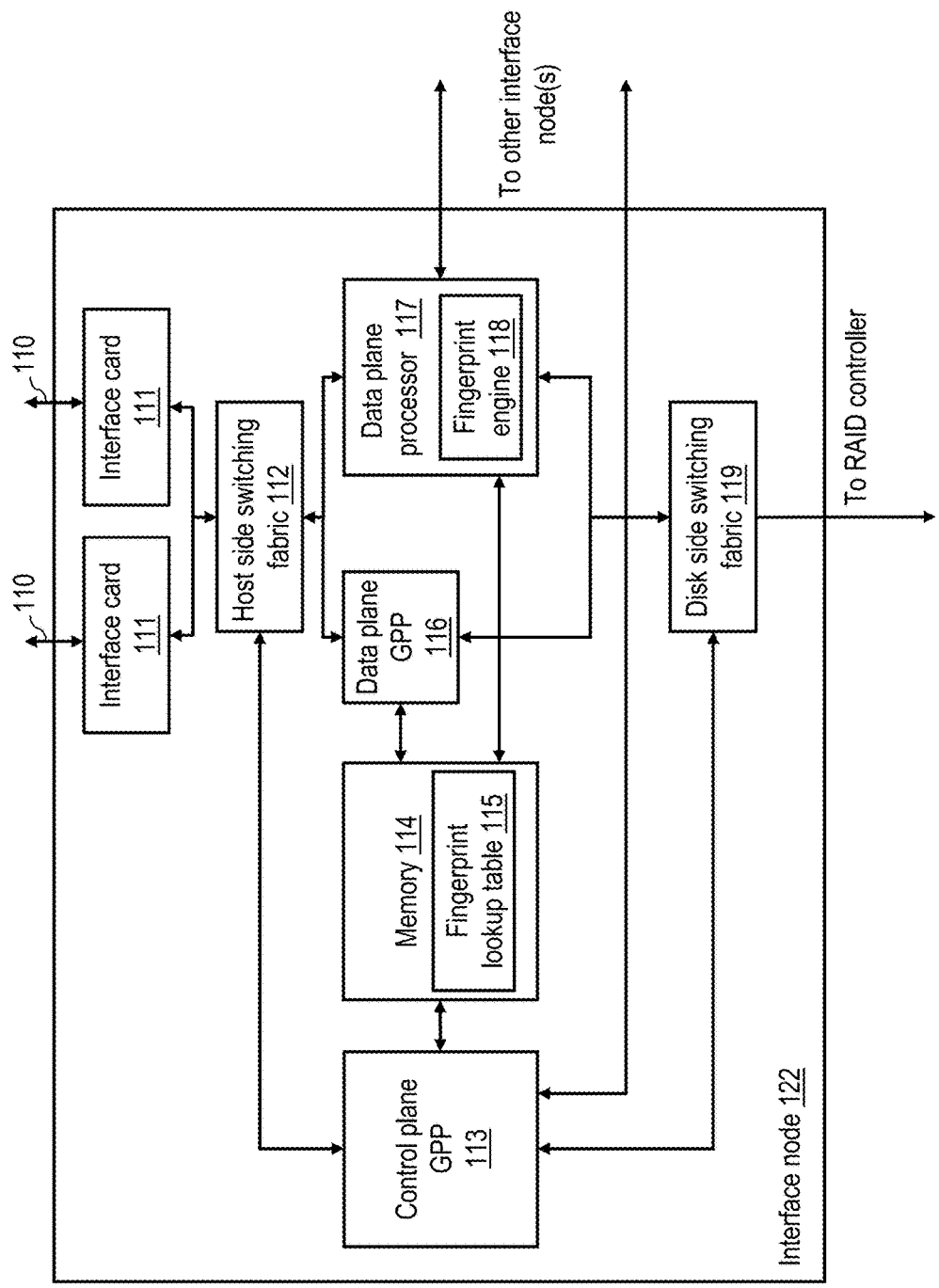
FIG. 1H is a more detailed block diagram of an exemplary interface node of a data storage system (storage node) of FIG. 1G.

FIG. 1H depicts a more detailed block diagram of an exemplary interface node 122 of data storage system 120 of FIG. 1G. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. Data plane processor 117 is a special purpose processor that can be implemented, for example, by an Application Specific Integrated Circuit (ASIC) or a Field Programmable Gate Array (FPGA)). Control plane GPP 113, data plane GPP 116, and data plane processor 117 are all connected to memory 114 which may be implemented as a shared memory between these components, separate memories, or a combination thereof.

Data plane processor 117 implements a fingerprint engine 118 that generates fingerprints for received data chunks that are to be written to or read from flash cards 126. Data plane processor 117 may further access a fingerprint lookup table (LUT) 115 stored in memory 114 either directly or by communicating with data plane GPP 116 or control plane GPP 113. Fingerprints for received data chunks may include hashes, CRCs, or a combination of hashes and CRCs. Fingerprint engine 118 (or other logic in data plane processor 117) may also be configured to determine compressed page sizes of received data pages. Fingerprint LUT 115 stores fingerprints for data pages that are stored in flash cards 126. It should be appreciated that fingerprint LUT 115 may, at any given time, only store fingerprints for some of the data pages stored in flash cards 126 due to memory size limitations.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to flash cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to RAID controller 124 through disk side switching fabric 119 which typically consist of a PCIe switch, but other switch technologies may be used as well. FIG. 1H further illustrates control plane GPP 113 and data plane processor 117 being connected to other interface nodes 122 in data storage system 120 to handle fail-over scenarios or for performing other data synchronization functions.

Figure 1I:
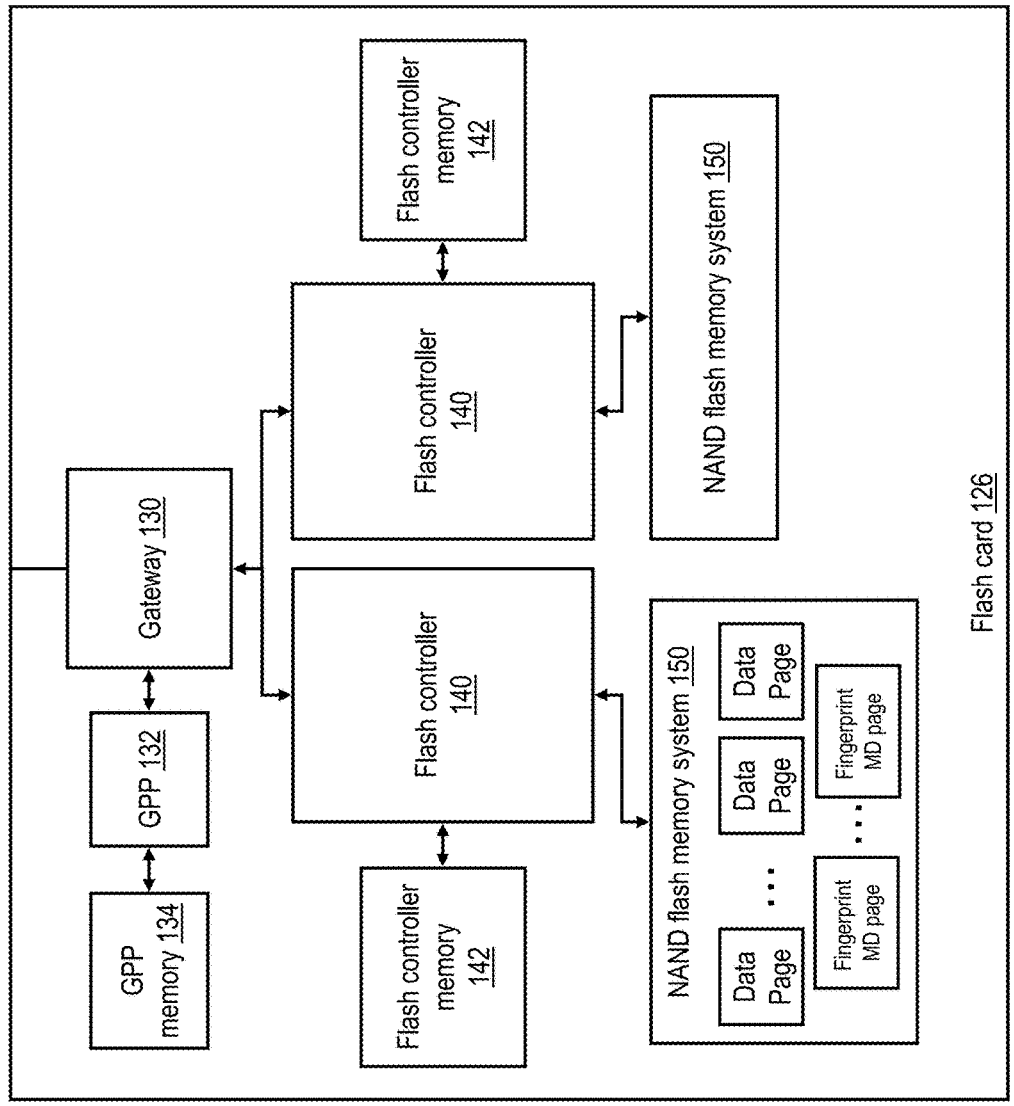
FIG. 1I is a more detailed block diagram of an exemplary flash card of the data storage system of FIG. 1G.

FIG. 1I depicts a more detailed block diagram of a flash card 126 of data storage system 120 of FIG. 1G. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1I) associated with NAND flash memory systems 150. For example, NAND flash memory systems 150 may store a combination of data pages and one or more fingerprint metadata (MD) pages that provide fingerprint metadata for one or more data chunks. In an alternative embodiment, fingerprint MD may be stored in a different memory than data pages.

Flash controllers 140 implement a Flash Translation Layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the logical page typically having a size of four (4) kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed page sizes of data pages stored in NAND flash memory system 150 and even further their CRC values.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
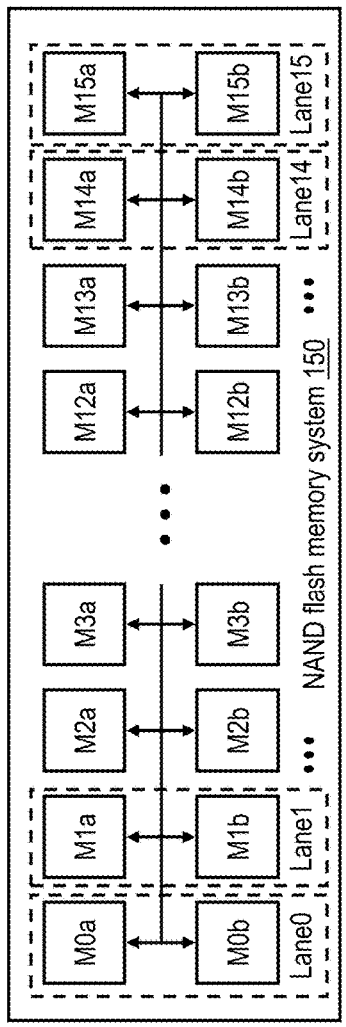
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
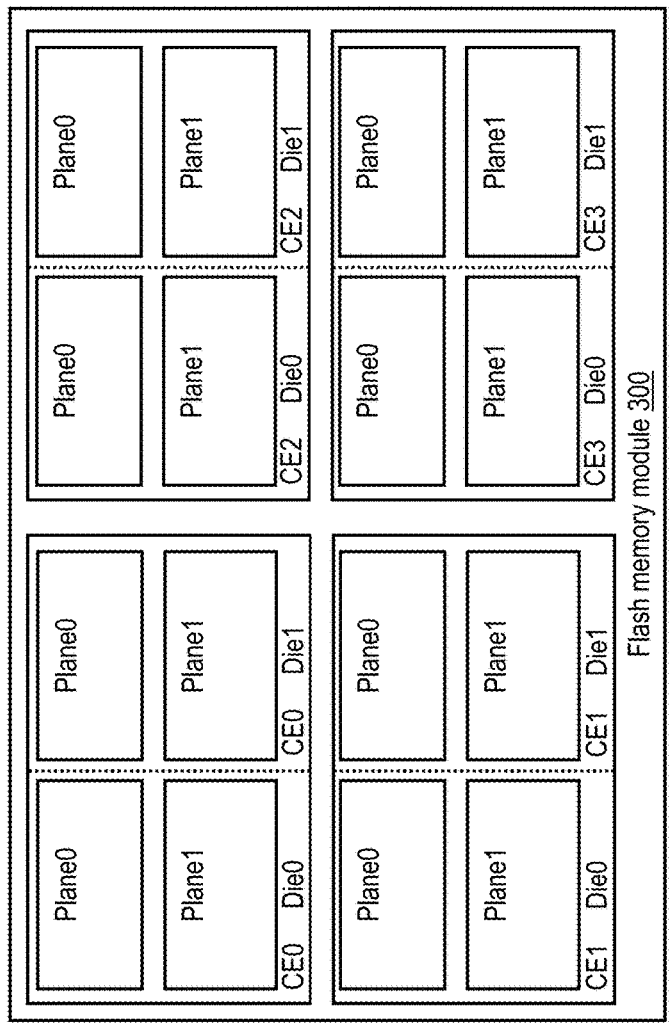

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
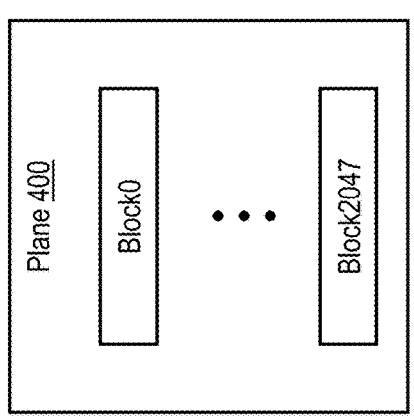
Figure 5:
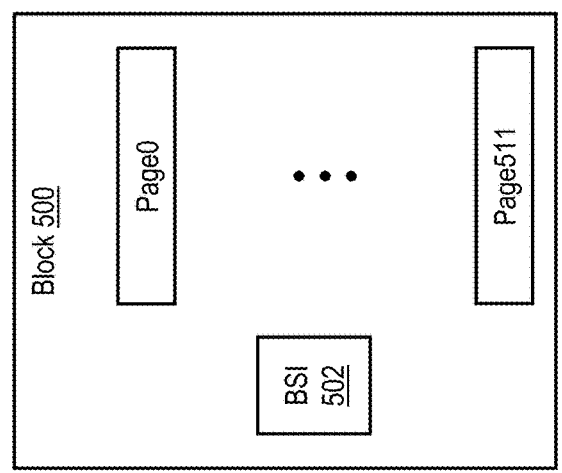

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes block status information (BSI) 502, which indicates the status of each physical page in that block 500 as retired (i.e., no longer used to store user data) or non-retired (i.e., active or still usable to store user data). In various implementations, BSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
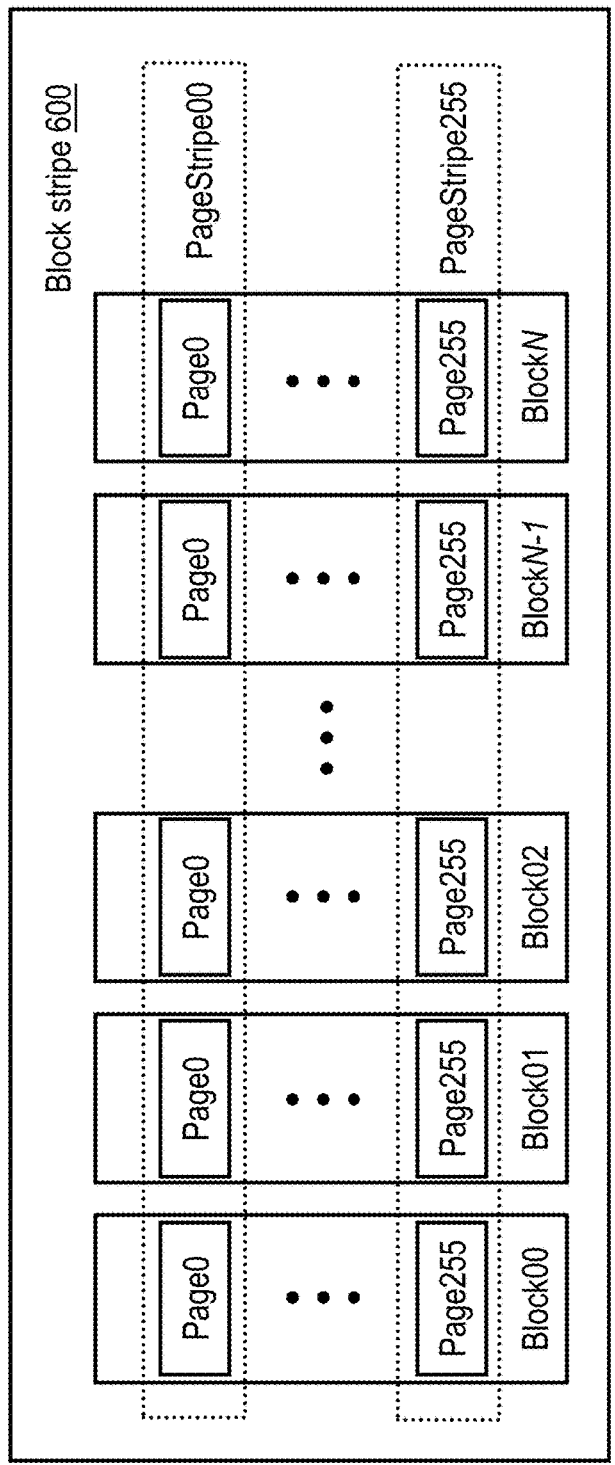
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
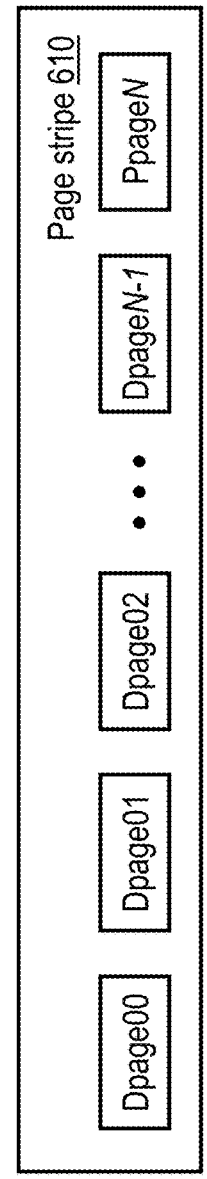
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN-1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below. Similarly to logical data pages that are being placed into page stripes of a block stripe, fingerprint MD pages may be placed there as well. Logical data pages and fingerprint MD pages may be intermingled. In fact, flash card 126 may actually not know the difference between regular logical data pages and fingerprint MD pages. The fingerprint MD pages may be stored on a dedicated meta-data volume controlled by the interface nodes 122 and not visible to the processor system 102. As the flash cards 126 have no notion of volumes, fingerprint MD page operations are handled as regular read and write operations.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704, and CRC field 706. In case data field 702 holds fractions of logical data pages, LBA field 704 further holds information on which fractions of logical data pages are stored in data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of LBA fields 704 of codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142. As mentioned above, an LPT table, such as LPT table 900, can also be configured to store compressed page sizes of data pages stored in NAND flash memory systems 150 to aid in data deduplication.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of RTU queues 906 corresponding to its channel. For example, in one embodiment, RTU queues 906 include, for each channel, a respective RTU queue 906 for each of a plurality of block health grades. In various implementations, between 2 and 8 RTU queues 906 per lane (and a corresponding number of block health grades) have been found to be sufficient.

A build block stripes function 920 performed by flash management code running on GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write TOP and any non-updated data (i.e., in case the write request is smaller than a logical page, there is still valid data which needs to be handled in a read-modify-write manner) from an existing page stripe, if any, targeted by the write TOP, and/or stores the write data of the write TOP and any non-updated (i.e., still valid) data from an existing page stripe, if any, targeted by the write TOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on GPP 132 utilizes to facilitate garbage collection. As noted above, through the write process, pages are invalidated, and therefore portions of NAND flash memory system 150 become unused. An associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on an appropriate ready-to-use (RTU) queue 906 in associated GPP memory 134.

Figure 9:
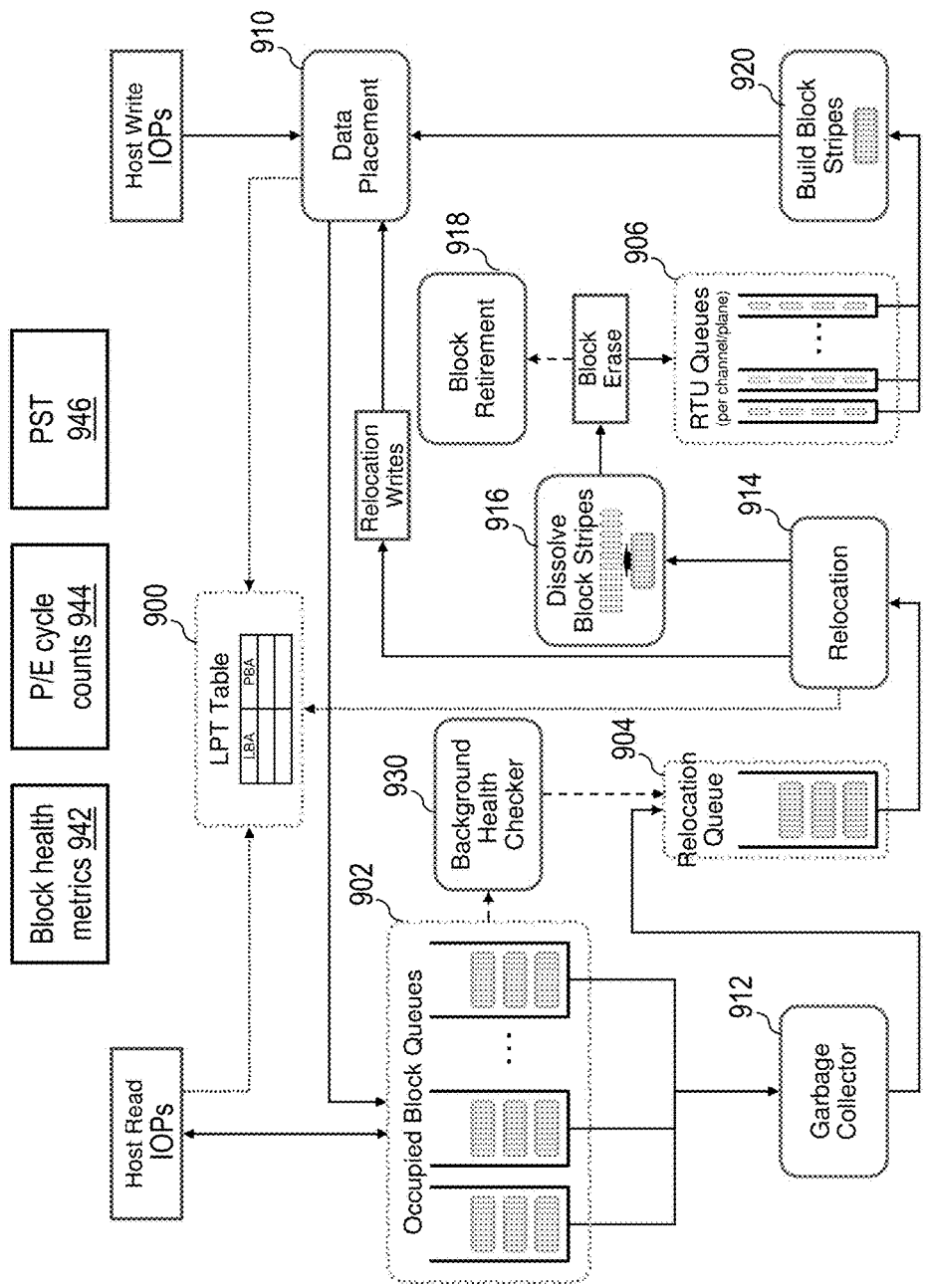
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of block health metrics 942, background health checker 930 may place block stripes on relocation queue 904 for handling by relocation function 914.

Figure 10:
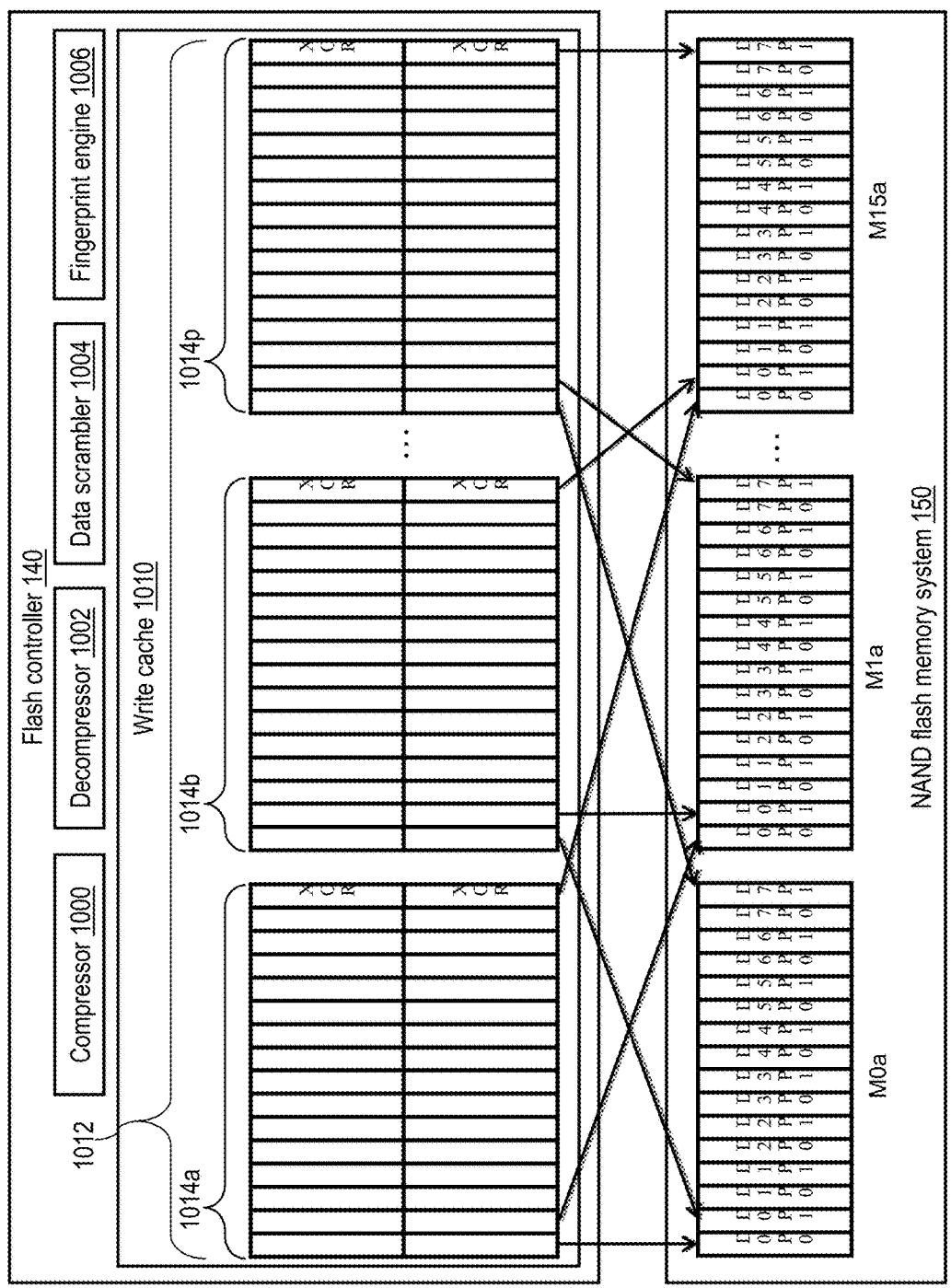
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0a, M0b, M1a, M1b, M1a, and M15b of a NAND flash memory system 150, for example, on a page-by-page basis rather than on a block-by-block basis, or a combination thereof. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 may also include an optional fingerprint engine 1006 similar to the fingerprint engine 118 in interface node 122. Flash controller 140 utilizes data scrambler 1004 to apply a predetermined data scrambling (i.e., randomization) pattern to data written to NAND flash memory 150 in order to improve endurance and mitigate cell-to-cell interference.

As further illustrated in FIG. 10, flash controller 140 includes a write cache 1010. Write cache 1010 includes storage for one or more cache lines 1012 for buffering write data in anticipation of writing the data to NAND flash memory system 150. In the illustrated embodiment, each cache line 1012 includes multiple (e.g., 16) segments 1014a-1014p, each providing storage for a respective page stripe of up to sixteen data pages (a maximum of fifteen data pages and one data protection page). As shown, for ease of implementation, it is preferred if flash controller 140 writes each page buffered in a given segment 1014 of cache line 1012 to the corresponding die index, plane index, and physical page index in each of sixteen flash memory modules. Thus, for example, flash controller 140 writes the data pages from segment 1014a to a first physical page (e.g., Page23) in each of flash memory modules M0a-M15a, writes the data pages from segment 1014b to a second physical page in each of flash memory modules M0a-M15a, and writes the data pages from segment 1014p to a sixteenth physical page in each of flash memory modules M0a-M15a.

The calculation of the fingerprint can be executed by fingerprint engine 118 and the comparison can be performed by control plane GPP 113, data plane processor 117, or data plane GPP 116. Alternatively, fingerprint calculation and comparison may also be delegated to flash controller 140 if a fingerprint engine 1006 is available in flash card 126. In the event a fingerprint for the candidate duplicate chunk is the same as a fingerprint for one of the stored data chunks, a data storage system may replace the received data page with a reference to a corresponding data chunk included in the one or more data pages stored in the storage system, and the candidate duplicate data chunk may be discarded (as the candidate duplicate chunk is a duplicate data chunk). In the event a fingerprint for the candidate duplicate chunk is not the same as a fingerprint for one of the stored data chunks, the candidate duplicate data chunk is stored in the storage system (as the candidate duplicate chunk is not a duplicate data chunk).

As noted above, data deduplication efficiency in a storage system with multiple storage nodes may be improved by implementing majority voting techniques that facilitate performing data deduplication at a storage node level. Typically, the disclosed majority voting techniques significantly reduce the number of copies of the same data chunk on different storage nodes at the same time. As previously mentioned, a hash function may be applied to each data chunk in an extent to provide a hash value for each data chunk. Each hash value may then be mapped to a storage node in the data storage system by a second function. For example, the second function may implement a modulo 'N' division of the hash value (e.g., hash_value modulo_number_nodes), where 'N' corresponds to the number of storage nodes in the storage system. In this manner, each data chunk in an extent votes for one of the storage nodes in a storage system to store the extent. In an alternative embodiment, a single function may be applied to each data chunk in an extent to provide votes for storage nodes in a storage system. In one or more embodiments, the extent is then destaged to the storage node that has the highest number of votes (i.e., the storage node with the majority vote). It should be appreciated that when two or more storage nodes have an equal number of votes that another technique may be employed to determine to which storage node an extent should be mapped.

Figure 11A:
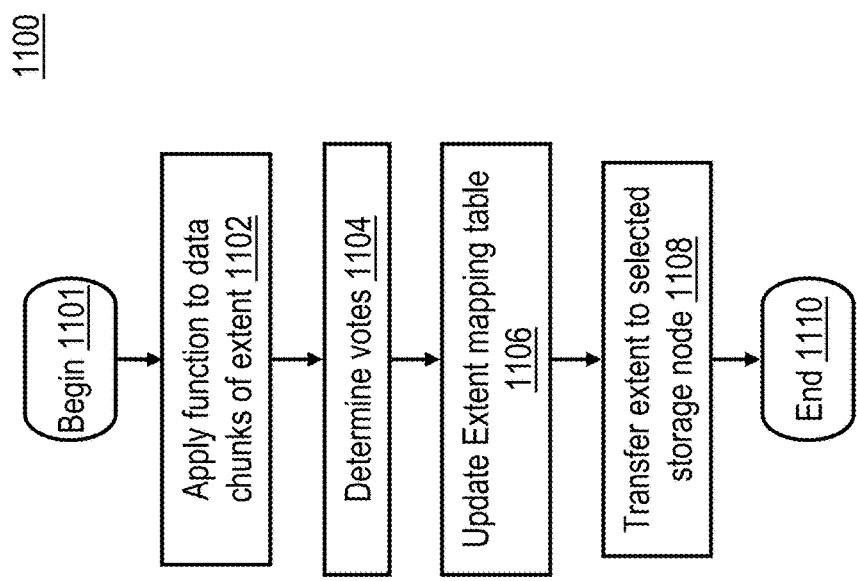
FIG. 11A is a high-level logical flowchart of an exemplary process that selects a storage node to store a full extent write to improve data deduplication efficiency for a storage system in accordance with one embodiment of the present disclosure.

With reference to FIG. 11A, an exemplary process 1100, associated with a full update to an extent, is illustrated. The full update selects which storage node of a storage system is to store a given extent based on analysis of data chunks of the extent in accordance with an embodiment of the present disclosure. Process 1100 may, for example, be executed by a controller (e.g., mapping node processor 127) located in mapping node 121. In one or more embodiments, process 1100 is initiated, in block 1101, by mapping node 121 when a full extent write is received by mapping node 121. Next, in block 1102, mapping node 121 applies a function to data chunks of the extent. For example, the applied function may include a first function that computes a hash value for each data chunk and a second function that computes a modulo 'N' division of each of the computed hash values, where 'N' corresponds to the number of storage nodes in a storage system.

Then, in block 1104, mapping node 121 determines a number of votes for each storage node 120. For example, determining the number of votes may include skipping all data chunks that consist of zeros only and/or skipping known popular data chunks. Known popular data chunks can either be determined deterministically from already stored data chunks or by utilizing heuristics or probabilistic methods that identify such data patterns. Next, in block 1106, the extent mapping table is updated. If needed, the update is propagated to other mapping nodes and/or journaled to persistent data storage, for example, on a data storage system 120. Then, in block 1108, mapping node 121 transfers (or initiates the transfer of) the extent to a selected storage node 120. From block 1108 control transfers to block 1110, where process 1100 terminates.

Figure 11B:
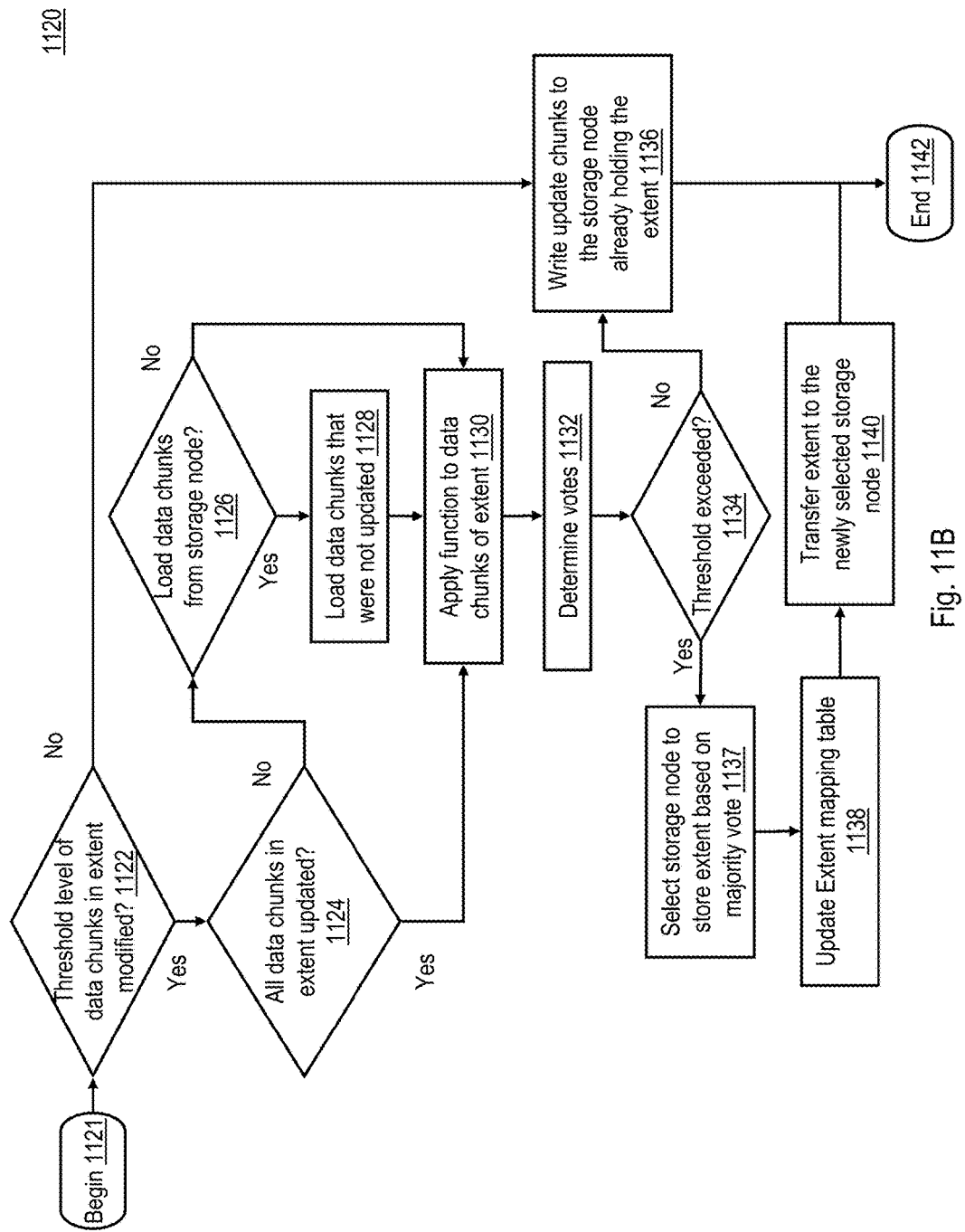
FIG. 11B is a high-level logical flowchart of an exemplary process that selects a storage node to store an extent write, that may be a full extent write or a partial extent write, to improve data deduplication efficiency for a storage system in accordance with one embodiment of the present disclosure.

With reference to FIG. 11B, an exemplary process 1120 that may be associated with a partial update to an extent is illustrated that triggers re-evaluation of data placement of the extent. The re-evaluation selects which storage node of a storage system is to store a given extent based on analysis of data chunks of the extent in accordance with an embodiment of the present disclosure. Process 1120 may, therefore, change the storage node on which data is being stored. Process 1120 may, for example, be executed by a controller (e.g., mapping node processor 127) located in mapping node 121. In one or more embodiments, process 1120 is initiated, in block 1121, by mapping node 121 when a (partial and/or full) write extent is received by mapping node 121. Next, in decision block 1122, mapping node 121 determines whether a threshold level of data chunks in the updated extent have been modified (e.g., by examining a header associated with the extent to retrieve a value for the number of data chunks modified and comparing the value to the threshold level). For example, for an extent with two-hundred fifty-six data chunks a threshold level 'Y' may be set equal to twenty. The threshold may represent a counter for the number of chunks being updated as an absolute or probabilistic value where extents with more updated chunks are more likely to be selected.

In response to the threshold level of data chunks in the extent not being updated, control transfers from block 1122 to block 1136, where mapping node 121 selects a storage node 120 that already stored the extent to write the updated data chunk for the extent. Following block 1136 control transfers to block 1142, where process 1120 terminates. In response to threshold level of data chunks in the extent being updated in block 1122 control transfers to decision block 1124. In block 1124, mapping node 121 determines whether all data chunks in the extent have been updated. In response to all data chunks in the extent not being updated, control transfers from block 1124 to decision block 1126, where mapping node 121 determines whether data chunks that were not updated should be loaded from an appropriate storage node 120. In response to mapping node 121 determining that data chunks that were not updated should be loaded into mapping node 121, control transfers from block 1126 to block 1128. In block 1128, mapping node 121 loads the data chunks that were not updated into mapping node 121 so that the non-updated chunks may be utilized in determining which storage node 120 should store the extent. Next, control transfers from block 1128 to block 1130, where mapping node 121 applies a function to the data chunks of the extent. For example, the applied function may include a first function that computes a hash value for each data chunk and a second function that computes a modulo 'N' division of each of the computed hash values, where 'N' corresponds to the number of storage nodes in a storage system.

In response to all data chunks in the extent being updated in block 1124, control transfers to block 1130 (see FIG. 11A, where block 1130 corresponds to block 1102, block 1132 corresponds to block 1104, block 1138 corresponds to block 1106, and block 1140 corresponds to block 1108). In this case, all data chunks are utilized in determining which storage node 120 should store the extent. In response to mapping node 121 determining that data chunks that were not updated should not be loaded into mapping node 121 in block 1126, control transfers to block 1130. In this case, only updated data chunks are utilized in determining which storage node 120 should store the extent. Next, in block

1132, mapping node 121 determines a number of votes for each storage node 120. In at least one embodiment this includes skipping all data chunks that consist of zeros only and/or skipping known popular data chunks. Known popular data chunks can either be determined deterministically from already stored data chunks or by utilizing heuristics or probabilistic methods that identify such data patterns. Then, in decision block 1134, mapping node 121 determines whether a majority vote threshold was exceeded. For example, for an extent with two-hundred fifty-six data chunks in a storage system having four storage nodes a majority vote threshold 'X' may be set equal to sixty-five (256/4+1).

In response to mapping node 121 determining that the majority vote threshold was exceeded in block 1134, control transfers to block 1137. In block 1137 mapping node 121 selects a given storage node 120 based on the majority vote. From block 1137 control transfers to block 1138, where an extent mapping table is updated to indicate the selected storage node. If needed, the update is propagated to other mapping nodes and/or journaled to persistent data storage, for example, on one of data storage systems 120. From block 1138 control transfers to block 1140, where mapping node 121 transfers (or initiates the transfer of) the extent to a selected storage node 120. From block 1140 control transfers to block 1142. In response to mapping node 121 determining that the majority vote threshold was not exceeded in block 1134 control transfers to block 1136 and then to block 1142.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, a controller of a non-volatile memory array retires physical pages within the non-volatile memory array on a page-by-page basis. The physical pages retired by the controller include a first physical page sharing a common set of memory cells with a second physical page. While the first physical page is retired, the controller retains the second physical page as an active physical page, writes dummy data to the first physical page, and writes data received from a host to the second physical page.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of selecting a storage node of a storage system to store data, comprising:
  applying, by a mapping node, a first function to at least some data chunks of an extent to provide respective first values for each of the at least some data chunks;
  selecting, by the mapping node, a storage node, included within multiple storage nodes of a storage system, to store the extent based on a majority vote derived from the respective first values; and
  performing, by the storage system, deduplication of the data chunks of the extent in the selected storage node using fingerprints computed on each of the data chunks, wherein one or more of the data chunks within the extent do not include useful data for a vote and the one or more of the data chunks within the extent that do not include useful data for the vote are not utilized in selecting the storage node to store the extent, and wherein the one or more of the data chunks within the extent that do not include useful data belong to a set of known popular data chunks.

2. The method of claim 1, wherein each of the first values are mapped to one of the storage nodes and the selecting is based on the majority vote of the mapped first values.

3. The method of claim 1, wherein the first values are dynamically calculated upon processing the extent and not stored persistently.

4. The method of claim 1, wherein at least some of the data chunks within the extent are not updated and the method further comprises
  loading data for the data chunks within the extent that are not updated prior to the applying;
  applying a second function to the respective first values to generate respective storage node votes for each of the data chunks; and
  selecting the storage node to store the extent based on the majority vote derived from the respective storage node votes.

5. The method of claim 4, wherein the first function is a hash function that computes a hash value and the second function performs a modulo 'N' division on the hash value, and wherein 'N' corresponds to a number of the storage nodes in the storage system.

6. The method of claim 4, wherein the method further comprises:
  setting a first threshold level for the majority vote;
  in response to the majority vote exceeding the first threshold level, transferring the extent to the storage node indicated by the majority vote; and
  in response to the majority vote not exceeding the first threshold level, transferring the extent to the storage node that previously stored the extent.

7. The method of claim 1, wherein the first function computes a hash value and a modulo 'N' division of the hash value, and wherein 'N' corresponds to a number of the storage nodes in the storage system.

8. A storage system, comprising:
a mapping node coupled to multiple storage nodes, wherein the mapping node is configured to:
apply a first function to at least some data chunks of an extent to provide respective first values for each of the at least some data chunks; and
select a storage node, included within the multiple storage nodes, to store the extent based on a majority vote derived from the respective first values;
wherein the storage system is configured to perform deduplication of the data chunks of the extent in the selected storage node using fingerprints computed on each of the data chunks, and wherein one or more of the data chunks within the extent do not include useful data for a vote and the one or more of the data chunks within the extent that do not include useful data for the vote are not utilized in selecting the storage node to store the extent, where the one or more of the data chunks within the extent that do not include useful data belong to a set of known popular data chunks.

9. The storage system of claim 8, wherein at least some of the data chunks within the extent are not updated and the mapping node is further configured to:
load data for the data chunks within the extent that are not updated into the mapping node prior to the applying;
apply a second function to the respective first values to generate respective storage node votes for each of the data chunks; and
select the storage node to store the extent based on the majority vote derived from the respective storage node votes.

10. The storage system of claim 9, wherein the first function is a hash function that computes a hash value and the second function performs a modulo 'N' division on the hash value, and wherein 'N' corresponds to a number of the storage nodes in the storage system.

11. The storage system of claim 9, wherein mapping node is further configured to:
set a first threshold level for the majority vote;
in response to the majority vote exceeding the first threshold level, transfer the extent to the storage node indicated by the majority vote; and
in response to the majority vote not exceeding the first threshold level, transfer the extent to the storage node that previously stored the extent.

12. The storage system of claim 8, wherein at least some of the data chunks within the extent are not updated and the mapping node is further configured to:

determine whether a first threshold level of the data chunks have been updated prior to the applying and the selecting;
in response to the first threshold level of the data chunks having been updated, apply a second function to the first values to provide respective storage node votes for each of the updated data chunks;
in response to the first threshold level of the data chunks having been updated, select the storage node to store the extent based on the majority vote derived from the respective storage node votes;
in response to the first threshold level of the data chunks having been updated, transfer the extent to the storage node or another storage node based on the majority vote; and
in response to the first threshold level of the data chunks not having been updated, transfer the extent to the another storage node, wherein the another storage node previously stored the extent.

13. The storage system of claim 12, wherein the mapping node is further configured to:
in response to the majority vote exceeding a second threshold level, transfer the extent to the storage node with the majority vote; and
in response to the majority vote not exceeding the second threshold level, transfer the extent to the another storage node.

14. A computer program product, the computer program product comprising a computer readable storage medium having program instructions embodied therewith, the program instructions executable by a controller of a storage system to cause the controller to:
apply a first function to at least some data chunks of an extent to provide respective first values for each of the at least some data chunks;
select a storage node, included within multiple storage nodes of a storage system, to store the extent based on a majority vote derived from the respective first values; and
perform deduplication of the data chunks of the extent in the selected storage node using fingerprints computed on each of the data chunks, wherein one or more of the data chunks within the extent do not include useful data for a vote and the one or more of the data chunks within the extent that do not include useful data for the vote are not utilized in selecting the storage node to store the extent, and wherein the one or more of the data chunks within the extent that do not include useful data belong to a set of known popular data chunks.

* * * * *